Miles Waterhouse's Flock Duster.
No. 73144
PATENTED JAN 7 1868
Fig I
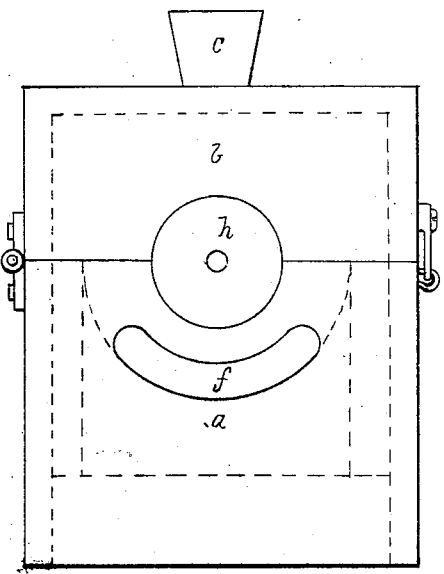
Fig II
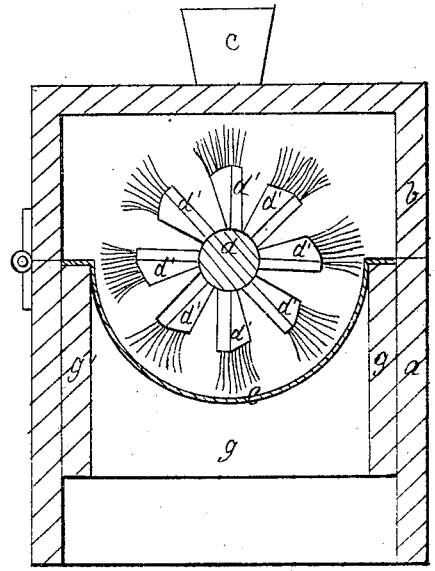
Fig III
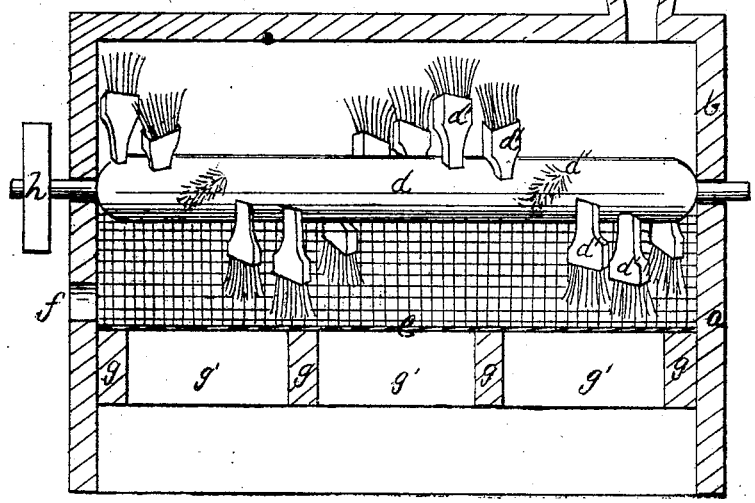
Witnesses
S. Holmes
W. Holmes
Inventor
Miles Waterhouse

United States Patent Office.

MILES WATERHOUSE, OF PASSAIC, NEW JERSEY.

Letters Patent No. 73,144, dated January 7, 1868.

IMPROVEMENT IN FLOCK-DUSTER.

*The Schedule referred to in these Letters Patent and making part of the same.*

TO ALL WHOM IT MAY CONCERN:

Be it known that I, MILES WATERHOUSE, of Passaic, in the county of Passaic, and State of New Jersey, have invented a new and useful Machine for the Purpose of Separating, Dusting, or Cleaning Woollen Flocks, or other filamentous substances; and I hereby declare the following to be a full and exact description thereof, reference being had to the annexed drawings, making part of this specification, in which—

Figure I is an end view of the casing or outside framework of the machine.

Figure II is a transverse sectional view.

Figure III is a longitudinal view, showing the several parts in section.

Like letters denote like parts in the several figures.

The casing or framework $a$ consists of a rectangular box, which is covered by the top or lid $b$, to which is secured the hopper or inlet $c$. The shaft $d$ has its bearings in the ends of the case $a$, and receives rotary motion through the pulley $h$, fast upon the end of one of its journals. Around the shaft $d$, in the form of a screw or helix, are placed the beater-blades and brushes $d'$ $d'$ $d'$, &c. Beneath the brush-shaft $d$, and concentric therewith, is the semi-cylindrical wire screen $e$, which is fastened to the framework, and supported at proper distances by the inverted bridge-pieces $g$ $g$ $g$ $g$, the ends of which are sustained by the two longitudinal pieces $g'$ $g'$. The curved opening $f$ is for the discharge of the flock or filamentous matters, after having undergone the separating or cleansing process.

Rotary motion being communicated to the shaft $d$ through the pulley $h$ in the proper direction, and the flocks to be operated upon fed in by the hopper $c$, a violent tossing, beating, or trituration of the flocks will be accomplished by the beaters and brushes $d'$ $d'$ $d'$, and at the same time a forward movement towards the outlet $f$ will be produced regularly and continuously. The action of the brushes and beaters is to force the flocks alternately against and sweep them from the surface of the screen $e$, and at the same time to carry them forward, in consequence of their spiral arrangement, continuously towards the outlet or aperture of discharge $f$. In this way the small and valueless particles of wool or foreign matters are separated from the more valuable, and forced through the semi-cylindrical screen or sieve, and retained in the enclosed space or receptacle below the inverted bridge-pieces.

I do not claim broadly the use of brushes or beaters in cleaning or separating flocks or other filamentous material; neither do I claim for such purpose a semi-cylindrical screen, as such has been used before; but I do claim the rotating brush-cylinder $d$, with its spirally-arranged brushes and beaters $d'$ $d'$ $d'$, when combined together, and with the screen $e$ and the openings $c$ and $f$, in the manner and for the purposes shown and described.

MILES WATERHOUSE.

Witnesses:
L. HOLMS,
M. HOLMS.